Nov. 22, 1932.  A. S. HOWELL  1,888,725
FILM REEL
Filed Aug. 3, 1928
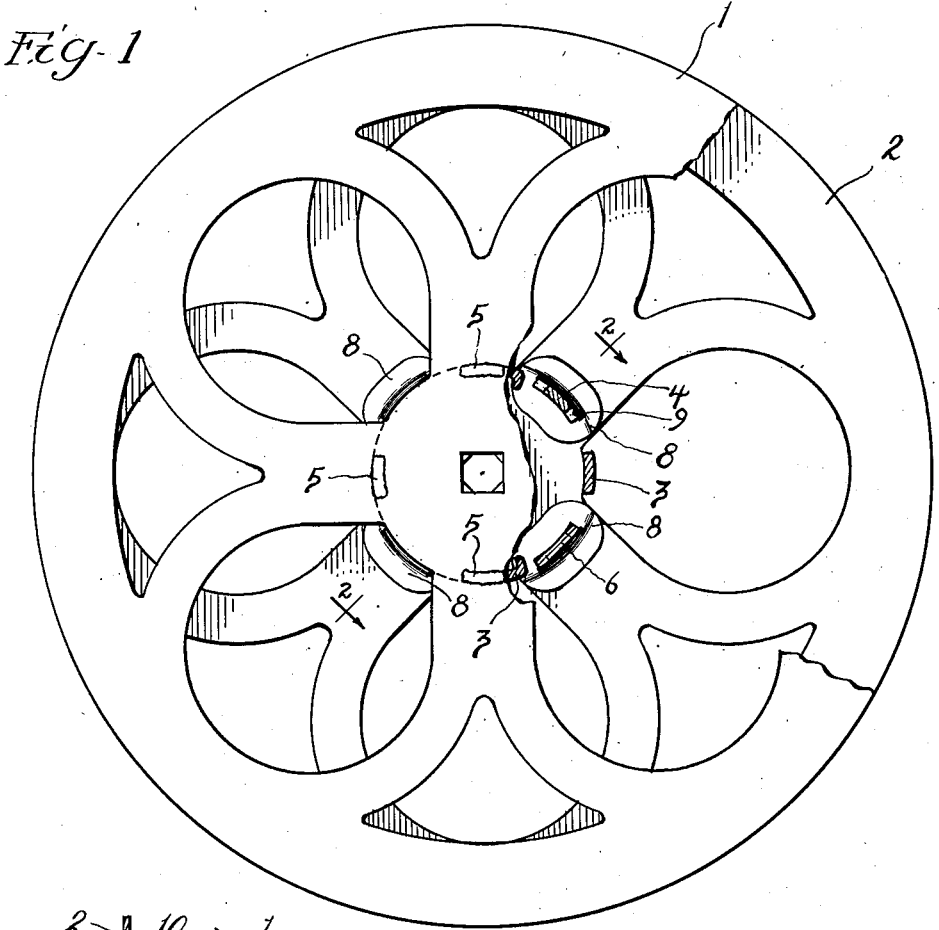
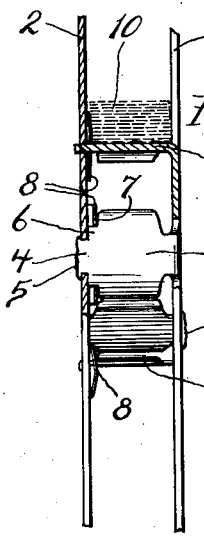
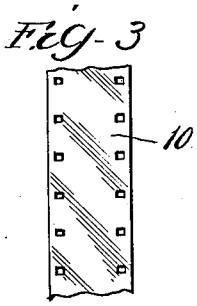
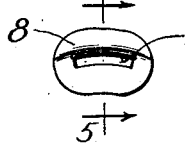
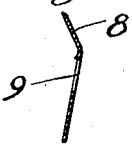
Inventor:-
Albert S. Howell
By:- Miehle & Miehle, atty's.

Patented Nov. 22, 1932

1,888,725

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

FILM REEL

Application filed August 3, 1928. Serial No. 297,296.

My invention relates particularly to motion picture film reels such as are used on motion picture projecting machines although not limited to this use alone.

The main object of the invention resides in the provision of a simple and effective structure whereby the end of a film may be quickly and conveniently attached to the reel at the hub thereof for the winding of the film on the reel.

With this object in view my invention consists in certain features of novelty in the construction, combination and arrangement of parts by which the said object and certain other objects, hereinafter appearing, are effected, all as fully described with reference to the accompanying drawing and more particularly pointed out in the claims.

In the said drawing:—

Figure 1 is a side elevation of a motion picture film reel embodying my invention.

Figure 2 is a partial edgewise elevation of the same with parts broken away and in section on the line 2—2 of Figure 1;

Figure 3 is a face view of a portion of a motion picture film adapted to be wound on the reel;

Figure 4 is a face view of one of the spring washers of the device, hereinafter described; and Figure 5 is an enlarged section on the line 5—5 of Figure 4.

Like characters of reference indicate like parts in the several views.

Referring to the drawing, 1 and 2 designate respective parallel side plates of the reel, which are preferably formed of sheet metal, and struck from the metal of these plates are hub segments 3 spaced about the axis of the reel. The segments 3 of the plates 1 and 2 alternate to form the hub of the reel, and the outer ends of these segments are reduced, as designated at 4, and pass through apertures through adjacent side plates and are riveted over on the outer faces of the side plates, as designated at 5, in the assembly of the reel. See Figures 1 and 2.

The segments 3 of the plate 1 are adjacently spaced from the plate 2 about the end portions 4 thereof, thereby forming intermediately reduced portions 6 elongated in cross section corresponding with the periphery of the hub and forming shoulders 7 facing and adjacently spaced from the plate 2.

Spring washers 8, having apertures 9 thereof elongated corresponding with the portions 6, are bent or angled facewise corresponding with the lengths of these apertures and in the direction of the adjacent plate 2, and are engaged on the portions 6 and engage with the plate 2 and the shoulders 7 to maintain the washers in proper position. See Figures 1, 2, 4 and 5.

The spacing of the plates 1 and 2 is such that a film 10 freely engages between the same, but the washers 8 reduce the effective width of this spacing adjacent the hub in a tapering manner toward the hub, so that the film is frictionally engaged edgewise at the hub between the springs 8 and the plate 1 to hold the end of the film on the reel for the winding of the film thereon, the yielding of the springs 8 permitting the film to lie flat on the hub while maintaining edgewise frictional engagement with the film.

It will be observed that the film may be easily and conveniently engaged and disengaged between the spring washers 8 and the plate 1 and that this engagement may be conveniently effected in the dark, thus adapting the reel particularly to use on motion picture projecting machines.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a film reel the combination of spaced side plates and a hub extending therebetween, said hub having a portion thereof extending to one of said plates and being spaced therefrom about said portion, and a spring member provided with an opening engaged on said portion and adapted to engage a film on said hub edgewise for frictional engagement thereof.

2. In a film reel the combination of spaced side plates and a hub extending therebetween, said hub having a portion thereof elongated in cross-section peripherally of the hub and extending to one of said plates, said hub being spaced from said plate about said portion and forming a shoulder facing said plate, and a spring member provided with an elongated aperture engaged on said hub portion and angled facewise to engage said shoulder at said aperture and to engage said plate with its edge portion.

3. In a sheet metal film reel the combination of spaced side plates and a hub extending therebetween, said hub having a portion thereof extending to one of said plates and then reduced and passing through an aperture through this plate and riveted over on the outer face of this plate, said hub being spaced from this plate about said portion and forming an intermediately reduced portion and a shoulder facing and spaced from said plate, and a spring washer engaged on said intermediately reduced portion and angled facewise to engage said shoulder at its aperture and to engage said plate with its edge portion.

4. In a sheet metal film reel the combination of spaced side plates and a hub extending therebetween, said hub having a portion thereof extending to one of said plates and then reduced and passing through an aperture through this plate and riveted over on the outer face of this plate, said hub being spaced from said plate about said portion and forming an intermediately reduced portion elongated in cross section peripherally of the hub and forming a shoulder facing and spaced from said plate, and a spring washer having its aperture elongated and engaged on said intermediately reduced portion and angled facewise in a plane transverse to the longitudinal extent of said aperture to engage said shoulder at its aperture and to engage said plate with its edge portion.

5. In a sheet metal film reel the combination of side plates having portions spaced about the axes thereof struck from the metal thereof and forming hub segments, the segments of one of said plates alternating with the segments of the other and each segment having its outer end reduced and passing through an aperture through the adjacent plate and riveted over on the outer face of the adjacent plate, the segments of one of said plates being spaced from the other plate about said portions thereof and forming intermediately reduced portions elongated in cross section peripherally of the hub and forming shoulders facing and spaced from said other plate, and spring washers having their apertures elongated and engaged on said intermediately reduced portions and angled facewise in planes transverse to the longitudinal extent of their apertures to engage said shoulders at their apertures and to engage said other plate with their edge portions.

In witness whereof I hereunto affix my signature this 1st day of August, 1928.

ALBERT S. HOWELL.